US012133191B2

(12) United States Patent
de la Broise et al.

(10) Patent No.: US 12,133,191 B2
(45) Date of Patent: Oct. 29, 2024

(54) COMMISSIONING ELECTRONIC DEVICES FOR USE IN A TRACKING SYSTEM

(71) Applicant: Tile, Inc., San Mateo, CA (US)

(72) Inventors: Josselin de la Broise, Mountain View, CA (US); Charles Y. Choi, San Francisco, CA (US); Dan Danknick, San Mateo, CA (US)

(73) Assignee: Tile, Inc., San Mateo, CA (US)

( * ) Notice: Subject to any disclaimer, the term of this patent is extended or adjusted under 35 U.S.C. 154(b) by 35 days.

(21) Appl. No.: 16/899,505

(22) Filed: Jun. 11, 2020

(65) Prior Publication Data
US 2020/0305114 A1    Sep. 24, 2020

Related U.S. Application Data

(63) Continuation of application No. 16/296,233, filed on Mar. 8, 2019, now Pat. No. 10,757,676.

(51) Int. Cl.
*H04W 64/00* (2009.01)
*G06F 7/58* (2006.01)
(Continued)

(52) U.S. Cl.
CPC .......... *H04W 64/003* (2013.01); *G06F 7/582* (2013.01); *G06F 21/73* (2013.01); *H04L 9/0866* (2013.01); *H04L 9/0869* (2013.01); *H04W 12/63* (2021.01)

(58) Field of Classification Search
CPC .. F24F 11/36; F24F 11/38; F24F 11/74; F24F 11/88; F25B 1/00; F25B 49/02; G06F 21/44; G06F 21/73; G06F 2221/2111; G06F 2221/2129; G06F 7/582; H04L 2209/80; H04L 2209/84; H04L 9/0838; H04L 9/0866; H04L 9/0869; H04W 12/069; H04W 12/108; H04W 12/35;
(Continued)

(56) References Cited

U.S. PATENT DOCUMENTS

| 2010/0009659 A1* | 1/2010 | Netanel | H04W 12/0431 455/411 |
| 2013/0297422 A1* | 11/2013 | Hunter | H04H 60/63 705/14.58 |

(Continued)

*Primary Examiner* — Charles N Appiah
*Assistant Examiner* — Nicole M Louis-Fils
(74) *Attorney, Agent, or Firm* — Baker Botts L.L.P.

(57) ABSTRACT

In one embodiment, a method of commissioning a third-party electronic device of a user for use with a tracking service includes detecting, by an application executing on the computing device of the user, the third-party electronic device within a communicative range of the computing device of the user. The third-party electronic device is not associated with the tracking service and is not communicatively coupled with the tracking service. The method includes initiating a commissioning exchange with the third-party electronic device. The method includes providing an output of the commissioning exchange to a tracking system server associated with the tracking service. The method includes receiving an acknowledgement that the third-party electronic device has been commissioned for use with the tracking service. The method includes providing, in response to the acknowledgement, a location associated with the third-party electronic device to the tracking system server.

20 Claims, 7 Drawing Sheets

(51) Int. Cl.
*G06F 21/73* (2013.01)
*H04L 9/08* (2006.01)
*H04W 12/63* (2021.01)

(58) Field of Classification Search
CPC ..... H04W 12/63; H04W 12/71; H04W 12/75; H04W 4/029; H04W 60/04; H04W 64/003; H04W 8/26
USPC .......................................................... 455/456
See application file for complete search history.

(56) References Cited

U.S. PATENT DOCUMENTS

| | | | |
|---|---|---|---|
| 2014/0012751 A1* | 1/2014 | Kuhn ................... | G06Q 20/367 |
| | | | 705/41 |
| 2016/0105764 A1* | 4/2016 | Evans ................... | G08B 21/24 |
| | | | 340/539.13 |
| 2017/0187525 A1* | 6/2017 | Rosenquist ........... | H04L 63/062 |
| 2018/0330293 A1* | 11/2018 | Kulkarni ............. | G06K 7/10366 |
| 2018/0332033 A1* | 11/2018 | Lakhani ................ | G06F 21/35 |
| 2018/0338241 A1* | 11/2018 | Li .......................... | H04W 4/40 |
| 2018/0367947 A1* | 12/2018 | Kim ...................... | H04W 4/021 |
| 2019/0213860 A1* | 7/2019 | Shaprio ................. | H04W 4/02 |
| 2019/0253243 A1* | 8/2019 | Zimmerman ........... | H04W 4/80 |
| 2020/0013054 A1* | 1/2020 | Upadhye ............ | G06Q 20/3278 |
| 2020/0167724 A1* | 5/2020 | Klitenik ............... | H04B 17/318 |

* cited by examiner

COMMISSIONING ELECTRONIC DEVICES FOR USE IN A TRACKING SYSTEM

PRIORITY

This application is a continuation of U.S. application Ser. No. 16/296,233, filed Mar. 8, 2019, now U.S. Pat. No. 10,757,676, which is incorporated herein by reference in its entirety.

BACKGROUND

This disclosure relates generally to tracking devices, and more specifically, to commissioning electronic devices for use in a centralized tracking system.

Users can attach tracking devices to one or more personal objects, such as keys, a phone, a car, a briefcase, and the like. The tracking device can communicatively couple to a mobile device of the user (or of a community member), and the mobile device can, in response to receiving a communication from the tracking device, determine a location of the mobile device (for instance, via a GPS receiver). The mobile device can then provide an identifier for the tracking device and the determined location of the mobile device to a cloud server, which can associate the tracking device with the determined location of the mobile device. Users can then query the cloud server to identify the location of objects to which the tracking devices are coupled.

Figure 1:
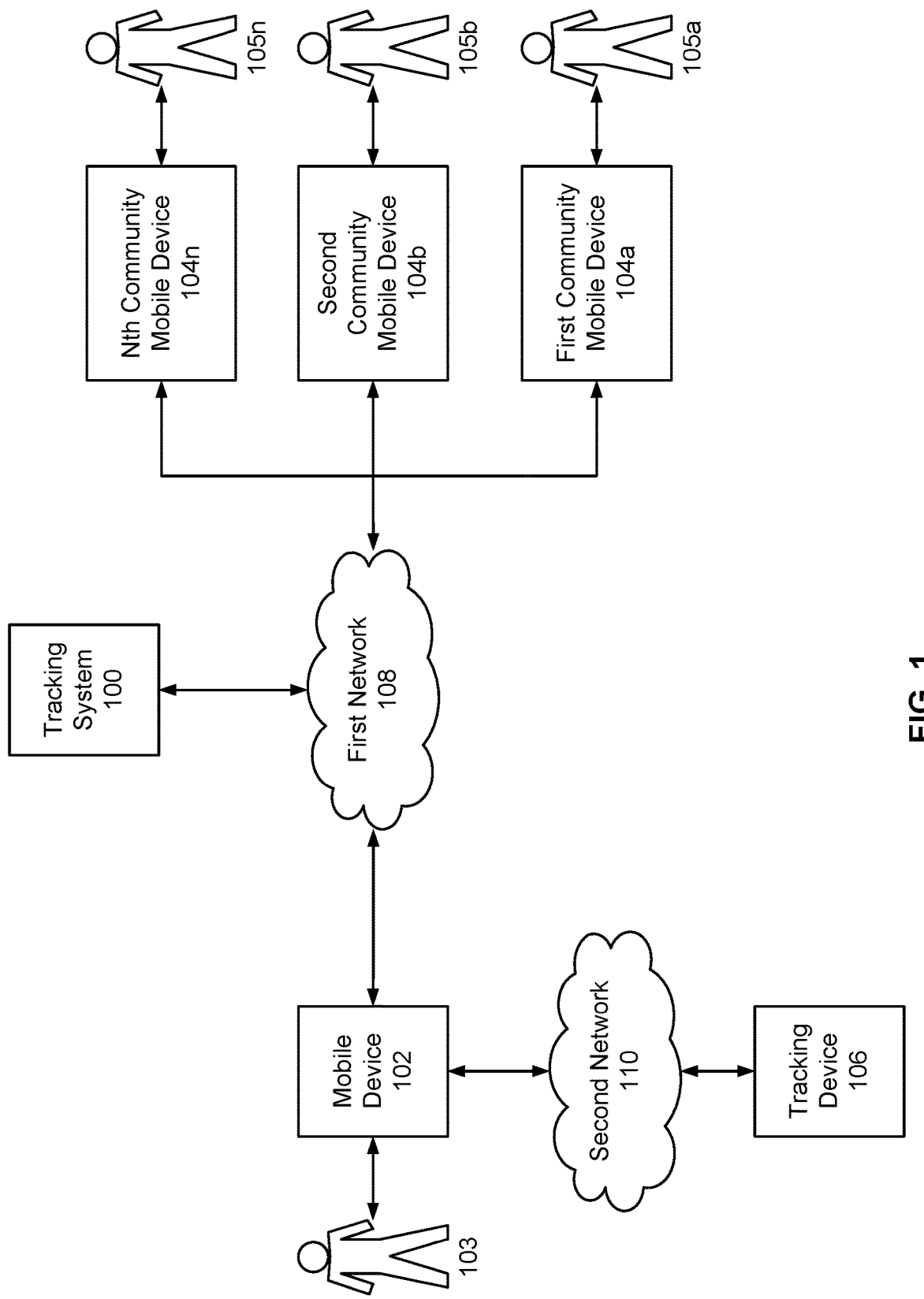
FIG. 1 illustrates an example tracking system environment in which a tracking device can operate, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. Or, a tracking device can be a device with a primary purpose unrelated to tracking functionality (e.g., a set of headphones, an electronic key, a wireless speaker, a fitness tracker, a camera) that has an integrated tracking component that allows the device to be tracked. The user can then use a mobile device (e.g., by way of a software application installed on the mobile device) or other device or service to track the tracking device. For example, the mobile device can perform a local search for a tracking device. However, in situations where the user is unable to locate the tracking device using their own mobile device (e.g., if the tracking device is beyond a distance within which the mobile device and the tracking device can communicate), the user can leverage the capabilities of a community of users of a tracking device system as described below.

A tracking system (also referred to herein as a "cloud server," "tracking server," or simply "server") can maintain user profiles associated with a plurality of users of the tracking system. The tracking system can associate each user within the system with one or more tracking devices associated the user (e.g., tracking devices that the user has purchased and is using to track objects owned by the user, or devices that include a tracking component and have additional non-tracking features). If the user's tracking device, or the object to which the tracking device is attached, becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device. As used herein, "mobile device" can refer to a phone, tablet computer, or other connected device, and can also refer to systems typically not consider mobile, such as servers, routers, gateways, access points, and specialized systems configured to couple to tracking devices and report a location of the tracking devices.

As used herein, "tracking device" can refer to any device configured to communicate with another device for the purpose of locating the tracking device. Tracking devices can be specialized or single-purpose devices (e.g., self-contained devices that include circuitry or components to communicate with another device). However, "tracking device" as used herein can also refer to device or object with a different primary function but with secondary tracking device functionality. For example, a wireless speaker can include tracking device components that allow a user to track and/or locate the wireless speaker. In some embodiments, a tracking device platform can be established such that devices and objects that satisfy one or more criteria can act as tracking devices within a tracking device ecosystem. For instance, a tracking device provider can provide an SDK or custom chipset that, when incorporated into an object or device, enable the object or device to function as tracking devices, to communicate with other devices within the tracking device ecosystem, and to implement the functionalities described herein.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a first network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

System Overview

Figure 2:
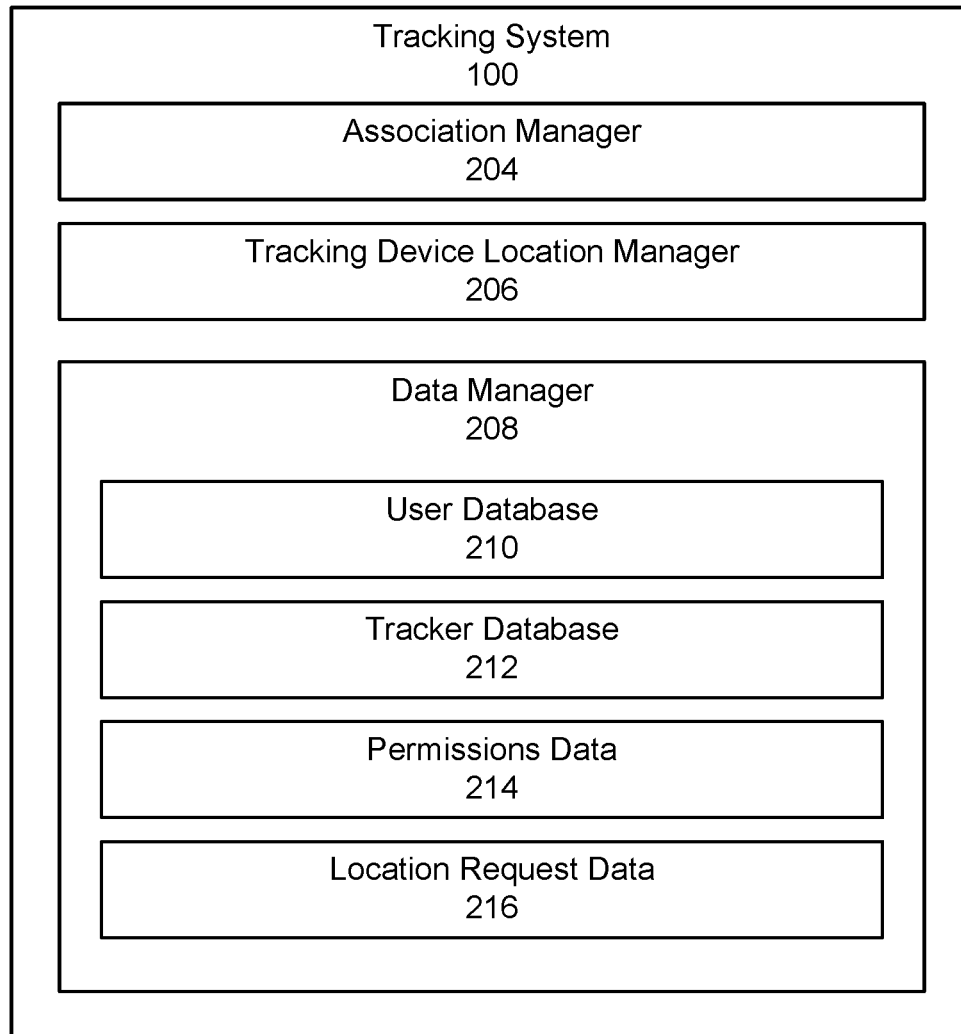
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

Figure 3:
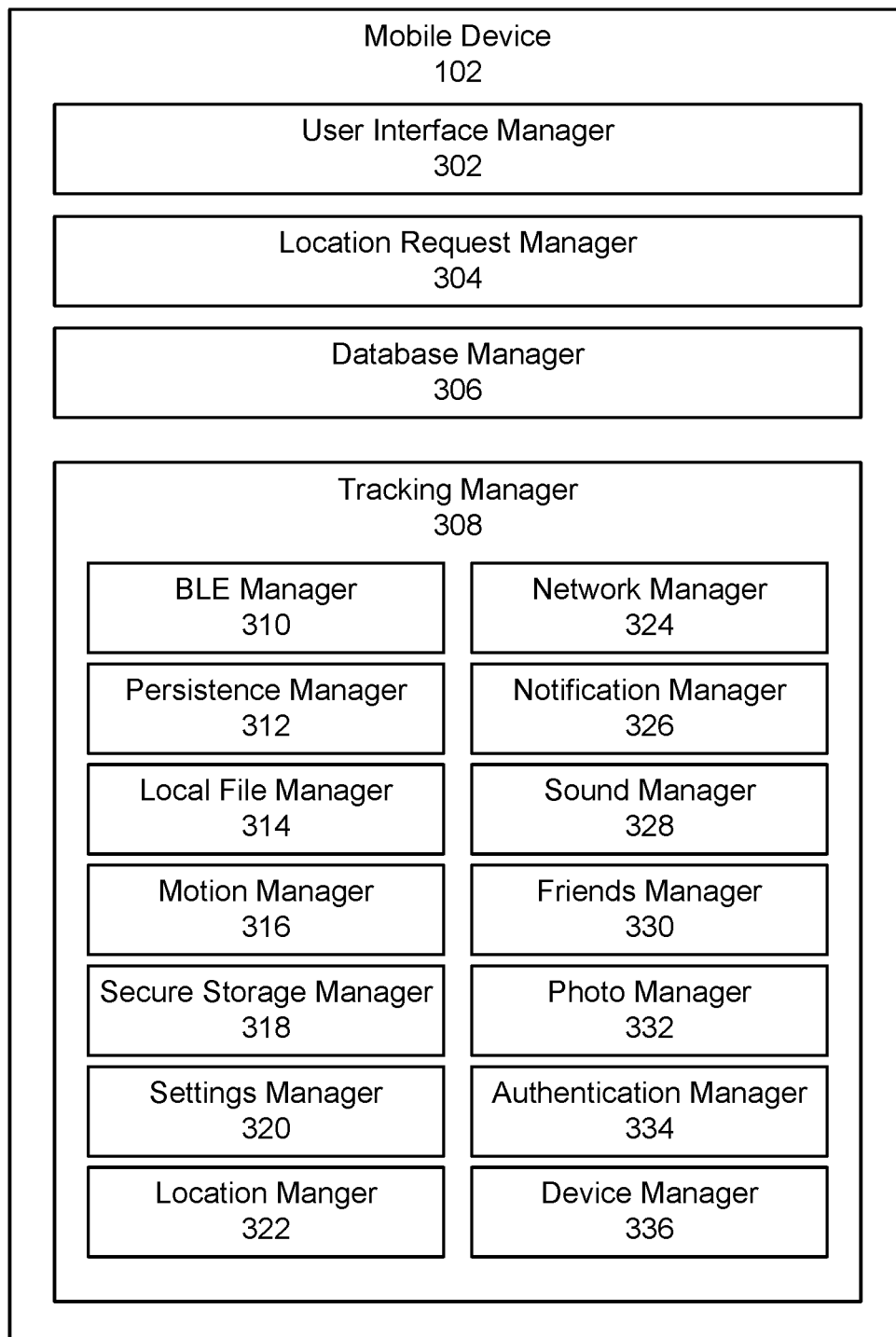
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable, from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
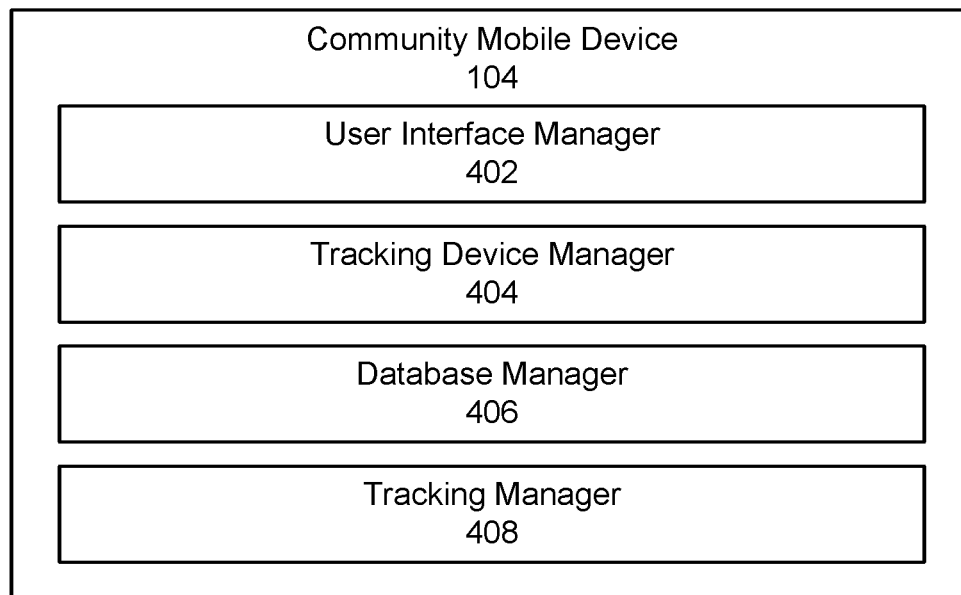
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
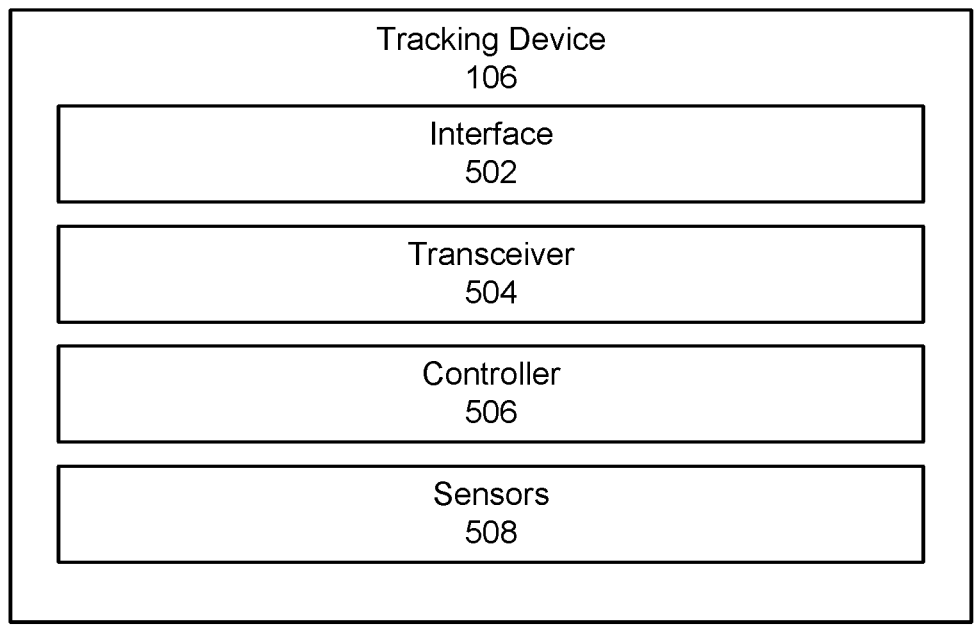
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, and one or more sensors 508. The transceiver 504 is a hardware circuit capable of both transmitting and receiving signals. It should be noted that in other embodiments, the tracking device 106 includes fewer, additional, or different components than those illustrated in FIG. 5.

The interface 502 provides a communicative interface between the tracking device 106 and one or more other devices, such as a mobile device 102. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, though in other embodiments, the interface 502 can manage other suitable wireless connection protocols (such as WiFi, Global System for Mobile Communications or GSM, and the like).

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable communicative functionality of the tracking device 106 (such as a GSM transmitter and receiving), can configure the tracking device into a sleep mode or awake mode, can configure the tracking device into a power saving mode, and the like. The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508, or based on any other suitable criteria.

The sensors 508 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506.

Device Commissioning for Use within a Tracking System

As noted above, a user can commission an electronic device, for instance a device with a primary function other than tracking, for use in the tracking system 100. In one embodiment, the electronic device may be manufactured by a third-party, such as a manufacturer or company other than an entity responsible for operation of the tracking system 100. Once an electronic device is commissioned to operate with the tracking system 100, tracking and location functionality can be enabled within the electronic device, thus enabling the electronic device to operate as a tracking device within the tracking system 100.

Figure 6:
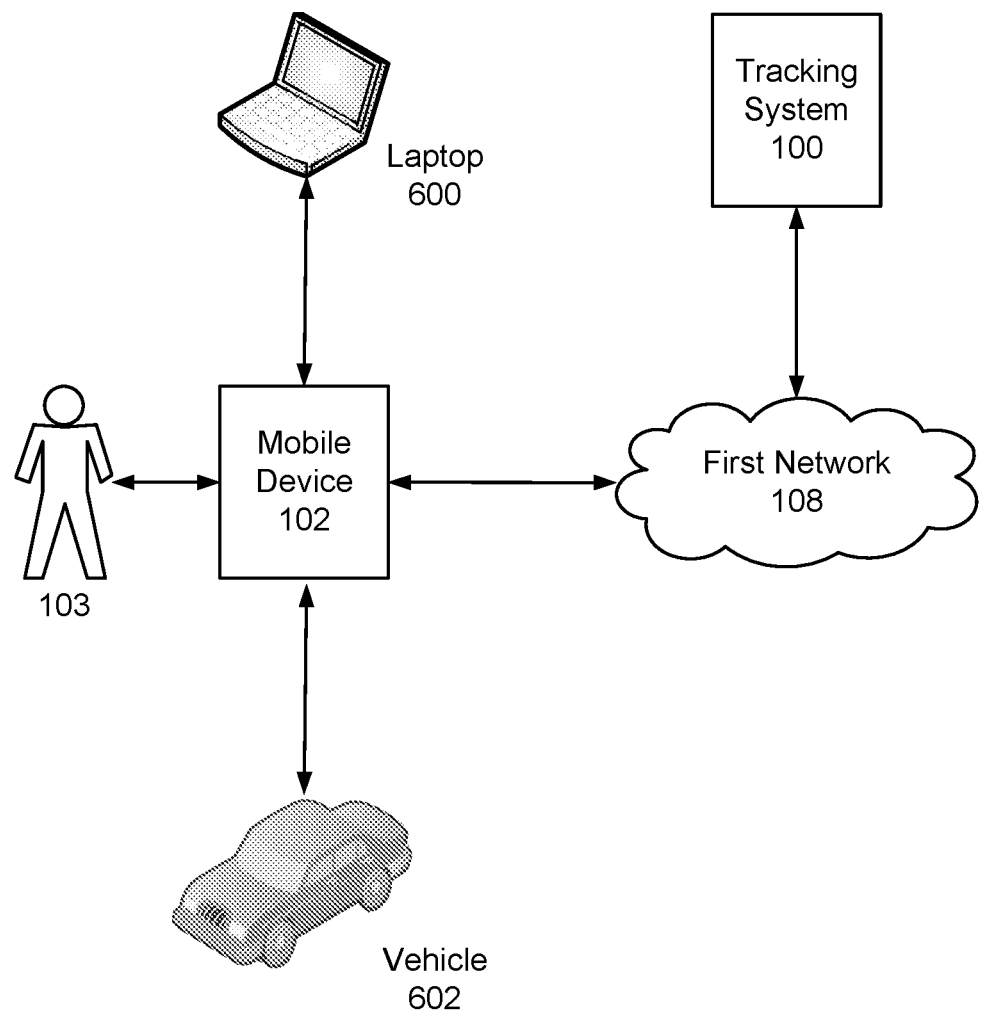
FIG. 6 illustrates an example tracking system environment in which an electronic device can be commissioned to operate, according to one embodiment.

FIG. 6 illustrates an example tracking system environment in which an electronic device can be commissioned to operate, according to one embodiment. The environment of FIG. 6 includes a user 103 with a mobile device 102 communicatively coupled to a tracking system 100 via the first network 108. In addition, the environment of FIG. 6 includes two electronic devices for commissioning with the tracking system 100, but with a primary function other than tracking: a laptop 600 and a vehicle 602.

It should be noted that although FIG. 6 illustrates a laptop and a vehicle, other types of electronic devices may be commissioned to operate with the tracking system 100, such as a pair of headphones, a tablet computer, a piece of luggage, a backpack, an electronic wallet, a set of keys, a smart watch, or any other electronic device equipped with functionality to operate as a tracking device (for instance, any electronic device with Bluetooth functionality or any device that is configured to communicate with the mobile device 102). In some embodiments, the electronic devices are not registered with the tracking system 100 prior to commissioning, and thus are unable to communicate with the tracking 100, either directly or via the mobile device 102. In other embodiments, the electronic devices are able to communicate with the tracking system 100, either directly or via the mobile device 102.

After commissioning an electronic device, the electronic device can operate as a tracking device as described above, for instance by providing an identifier to the mobile device 102, which in turn determines a location of the mobile device and provides the identifier of the electronic device and the location of the mobile device to the tracking system 100 (which in turn associates the identifier with the location).

In some embodiments, the user 103 commissions an electronic device for operation with the tracking system 100 for security purposes. For instance, once the electronic device is commissioned, the user can locate and keep track of the device by requesting a location of the electronic device from the tracking system 100, via a tracking application executed by the mobile device 102. In such embodiments, the tracking system 100 receives locations of the electronic device from other mobile devices that communicatively couple with the electronic device when within communicative range of the electronic device, and provides one or more of these received locations to the user when requested (or when the distance between the user and the electronic device exceeds a threshold). For example, if the user 103 parks the vehicle 602, which has been commissioned for use within the tracking system 100, and the vehicle 602 is stolen and moved to a location that is beyond the communication range of the mobile device 102, the mobile device 102 may notify the user 103. Thus, the commissioned electronic device ultimately functions as a tracking device within the tracking system 100 environment.

Figure 7:
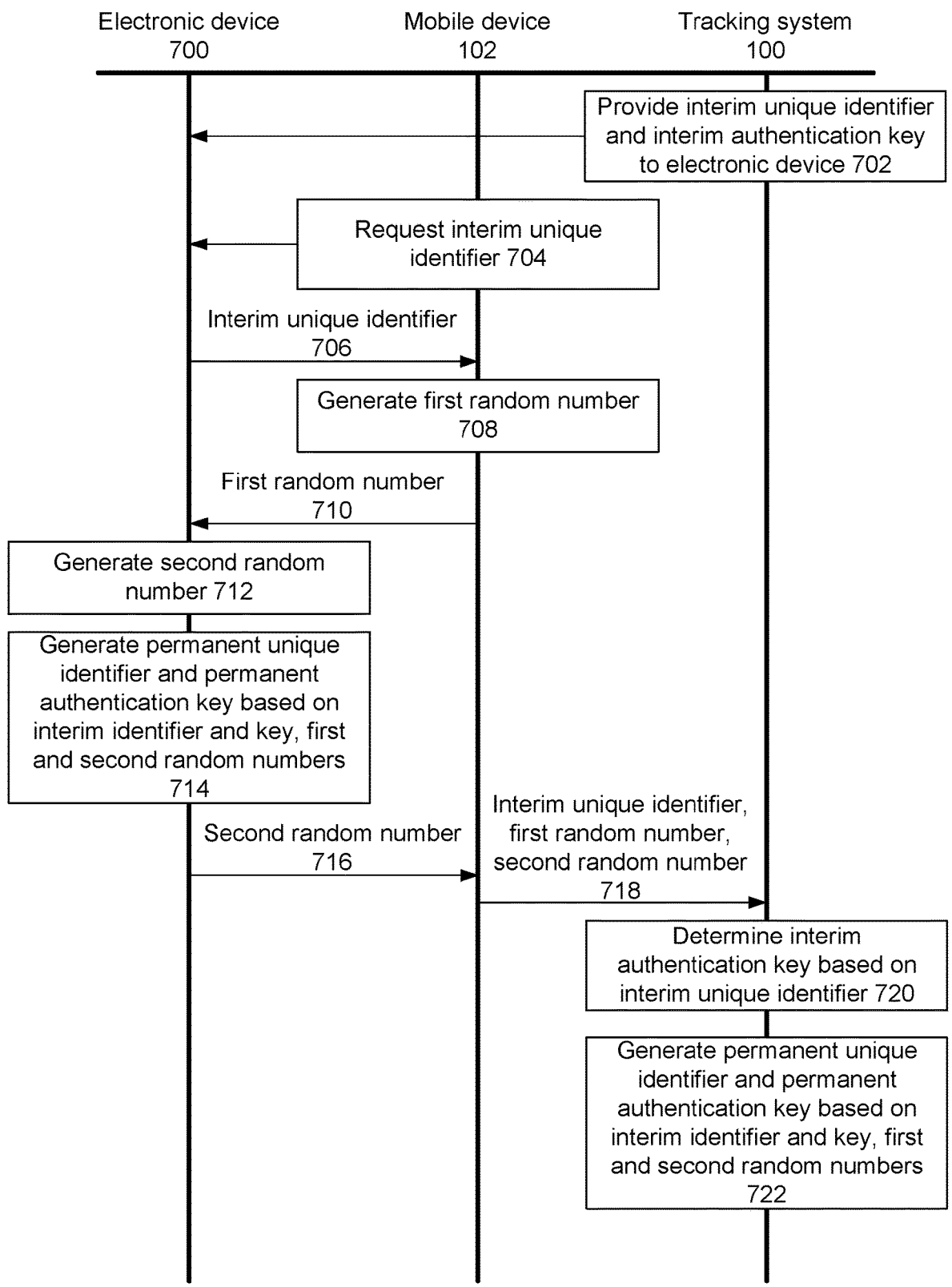
FIG. 7 illustrates interactions between a tracking system, mobile device, and electronic device for commissioning a device for use in a tracking system environment.

FIG. 7 illustrates interactions between a tracking system, mobile device, and electronic device for commissioning a device for use in a tracking system environment. The tracking system 100 provides 702 a pre-assigned interim unique identifier and interim authentication key to the electronic device 700. For instance, the tracking system 100 can generate interim unique identifiers and interim authentication keys, and can provide the interim identifiers and keys to a third-party manufacturer for assigning to electronic devices produced by the manufacturer. In some embodiments, the interim identifiers and keys are unique to a particular manufacturer such that the tracking system can determine the manufacturer of an electronic device based on the interim identifier or key assigned to the electronic device.

After communicatively coupling with the electronic device 700, the mobile device 102 requests 704 and then receives 706 the interim unique identifier from the electronic device 700. The mobile device 102 subsequently generates 708 a first random number, and provides 710 this first random number to the electronic device 700. In some embodiments, the first random number is generated based on the interim unique identifier, based on an identity of the electronic device 700, or based any other suitable factor. In other embodiments, the first random number is generated with no dependency on any other value.

The electronic device 700 generates 712 a second random number after the first random number is generated by the mobile device 102. The electronic device 700 then generates 714 a permanent unique identifier and permanent authentication key based on the first random number, the second random number, the interim identifier and the interim authentication key.

In one embodiment, the electronic device 700 generates 714 the permanent unique identifier and permanent authentication key using the first random number, the second random number, the interim identifier, and the interim authentication key as inputs to a hash function, such as the SHA256 hash function or the HMAC-SHA256 hash function. In other embodiments, the permanent unique identifier and the permanent authentication key are generated by combining, encoding, or encrypting the first random number, the second random number, the interim identifier, and the interim authentication key. In yet other embodiments, the permanent unique identifier and the permanent authentication key are generated by performing a mathematical operation or using lookup table substitution on one or more of first random number, the second random number, the interim identifier, and the interim authentication key.

The electronic device 700 does not transmit the generated permanent authentication key to the mobile device 102 or the tracking server 100, but provides 716 the second random number to the mobile device 102. The mobile device 712 subsequently provides 718 the interim unique identifier, first random number, and second random number to the tracking server of the tracking system 100. In response to receiving the interim unique identifier and first and second random numbers, the tracking system 100 determines 720 the interim authentication key (for instance by querying a table stored by the tracking system that maps interim identifiers to interim authentication keys). The tracking server 100 then generates 722 a permanent unique identifier and permanent authentication key, based on the first and second random numbers and the interim identifier and interim authentication key.

The tracking server uses the same function, algorithm, operation, transformation, or combination thereof as the electronic device 700 to generate 722 the permanent unique identifier and permanent authentication key. The electronic device 700 can generate a session key (for instance, by hashing a pre-determined combination of the permanent unique identifier and permanent authentication key), and can provide the session key to the tracking server 100. The tracking server 100 can verify that the permanent unique identifiers and authentication keys generated by the tracking server 100 and the electronic device 700 match by generating a session key and comparing it to the session key provided by the electronic device.

The process illustrated in FIG. 7 may occur in response to the user 103 submitting a request to commission the electronic device 700. In one embodiment, the user 103 may submit the commission request via a tracking application hosted and executed by the mobile device 102. The tracking application can inform the tracking system 100 of the commission request and can initiate the commissioning process described herein. In other embodiments, the user 103 can request to commission the electronic device 700 via a website or other interface associated with the tracking system 100, via an input on the electronic device, or via any other suitable means.

In some embodiments, commissioning the electronic device 700 can occur automatically, for instance in response to the mobile device 102 detecting an electronic device 700 within a threshold proximity of the mobile device. In such embodiments, the mobile device 102 can automatically initiate the process of commissioning the electronic device (e.g., without input from a user), or can prompt a user to commission the electronic device (e.g., via a notification displayed within a tracking application running on the mobile device or via a mobile operating system notification displayed outside of the context of the tracking application).

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

What is claimed is:

1. A method for commissioning a third-party electronic device of a user for use with a tracking service via an application associated with the tracking service and executing on a computing device of the user, the method comprising:

receiving, by a tracking system server of the tracking service, and from the computing device, output of a commissioning exchange between the computing device and the third-party electronic device, wherein the third-party electronic device is not associated with the tracking service and has a primary function not associated with device tracking, wherein the output comprises a first random number, a second random number, and a temporary unique identifier generated by the third-party electronic device, wherein, as part of the commissioning exchange, the third-party electronic device generates a first permanent unique identifier based on the first random number, the second random number, and the temporary unique identifier, and wherein the first permanent unique identifier is not provided to the computing device or the tracking system server;

generating, by the tracking system server, a second permanent unique identifier based on the first random number, the second random number, and an interim unique identifier using a predetermined function configured to generate the second permanent unique identifier, wherein the second permanent unique identifier is generated independently of the first permanent unique identifier as generated by the third-party electronic device;

exchanging, by the tracking system server, a verification value with the third-party electronic device and via the computing device, wherein the verification value comprises an indication of whether or not the first permanent unique identifier matches to the second permanent unique identifier; and in response to determining that the first permanent unique identifier matches to the second permanent unique identifier:

storing, by the tracking system server, the first permanent unique identifier or the second permanent unique identifier in a database associated with the tracking service;

providing, by the tracking system server, and to the computing device, an acknowledgement that the third-party electronic device has been commissioned for use with the tracking service, wherein, as a result of the third-party electronic device being commissioned for use with the tracking service, the tracking system server is configured to store location updates for the third-party electronic device in association with the first permanent unique identifier or the second permanent unique identifier, and wherein, after the third-party electronic device is commissioned for use with the tracking service, the third-party electronic device does not communicate directly with the tracking system server;

receiving, by the tracking system server, an updated location associated with the third-party electronic device from one of a plurality of other computing devices associated with the tracking system server after communicatively coupling with the third-party electronic device; and providing, by the tracking system server, and to the computing device, the updated location associated with the third-party electronic device.

2. The method of claim 1, wherein:

the computing device is one of the plurality of other computing devices, wherein each of the plurality of other computing devices is executing respective instances of the application associated with the tracking service; and a value based on the first permanent unique identifier or the second permanent unique identifier and the updated location is received from the instance of the application associated with the tracking service executing on the one of the plurality of other computing devices after communicatively coupling with the third-party electronic computing device.

3. The method of claim 2, further comprising:

determining, by the tracking system server, that the location associated with the third-party electronic device exceeds a threshold distance from a location associated with the computing device; and notifying, by the tracking system server, the computing device that the location associated with the third-party electronic device exceeds the threshold distance.

4. The method of claim 1, further comprising:

receiving, by the tracking system server, a request for a location associated with the third-party electronic device from the computing device, the request comprising a value based on the first permanent unique identifier or the second permanent unique identifier;

retrieving, by the tracking system server, the location associated with the third-party electronic device from the database by querying the database utilizing the first permanent unique identifier or the second permanent unique identifier; and providing, by the tracking system server, the retrieved location associated with the third-party electronic device to the computing device.

5. The method of claim 1, further comprising:

determining, by the tracking system server, an interim authentication key based on the interim unique identifier.

6. The method of claim 5, wherein the tracking system server has stored a plurality of preliminary unique identifiers in association with a plurality of interim authentication keys in the database associated with the tracking service; and wherein determining the interim authentication key comprises querying the database with the received interim unique identifier.

7. The method of claim 1, wherein exchanging the verification value comprises:

receiving, by the tracking system server, and from the computing device, a first session key generated by the third-party electronic device;

generating, by the tracking system server, a second session key based on a predetermined combination of the first permanent unique identifier or the second permanent unique identifier and information not received from the computing device; and verifying, by the tracking system server, the information by comparing the first session key and the second session key.

8. The method of claim 1, wherein the verification value is a session key for a communication session between the third-party electronic device and the tracking system server.

9. The method of claim 1, wherein the predetermined function comprises a hash function, mathematical operation, or using lookup table substitution.

10. A tracking system server associated with a tracking service and configured to commission a third-party electronic device of a user for use with the tracking service via an application associated with the tracking service and executing on a computing device of the user, the tracking system server further configured to:

receive, from the computing device, output of a commissioning exchange between the computing device and the third-party electronic device, wherein the third-party electronic device is not associated with the tracking service and has a primary function not associated with device tracking, wherein the output comprises a first random number, a second random number, and a temporary unique identifier generated by the third-party electronic device, wherein as part of the commissioning exchange, the third-party electronic device generates a first permanent unique identifier based on the first random number, the second random number, and the temporary unique identifier, and wherein the first permanent unique identifier is not provided to the computing device or the tracking system server;

generate a second permanent unique identifier based on the first random number, the second random number, and an interim unique identifier using a predetermined function configured to generate the second permanent unique identifier, wherein the second permanent unique identifier is generated independently of the first permanent unique identifier as generated by the third-party electronic device;

exchange a verification value with the third-party electronic device and via the computing device, wherein the verification value comprises an indication of whether or not the first permanent unique identifier matches to the second permanent unique identifier; and in response to determining that the first permanent unique identifier matches to the second permanent unique identifier:

store the first permanent unique identifier or the second permanent unique identifier in a database associated with the tracking service;

provide to the computing device an acknowledgement that the third-party electronic device has been commissioned for use with the tracking service, wherein, as a result of the third-party electronic device being commissioned for use with the tracking service, the tracking system server is configured to store location updates for the third-party electronic device in association with the first permanent unique identifier or the second permanent unique identifier, and wherein, after the third-party electronic device is commissioned for use with the tracking service, the third-party electronic device does not communicate directly with the tracking system server;

receive an updated location associated with the third-party electronic device from one of a plurality of other computing devices associated with the tracking system server after communicatively coupling with the third-party electronic device; and provide to the computing device the updated location associated with the third-party electronic device.

11. The tracking system server of claim 10, wherein the verification value is a session key for a communication session between the third-party electronic device and the tracking system server.

12. The tracking system server of claim 10, wherein the predetermined function comprises a hash function, mathematical operation, or using lookup table substitution.

13. A non-transitory computer-readable medium comprising instructions that, when executed by one or more processors of a tracking system server associated with a tracking service and configured to commission a third-party electronic device of a user for use with the tracking service via an application associated with the tracking service and executing on a computing device of the user, cause the tracking system server to:

receive, from the computing device, output of a commissioning exchange between the computing device and the third-party electronic device, wherein the third-party electronic device is not associated with the tracking service and has a primary function not associated with device tracking, wherein the output comprises a first random number, a second random number, and a temporary unique identifier generated by the third-party electronic device, wherein as part of the commissioning exchange, the third-party electronic device generates a first permanent unique identifier based on the first random number, the second random number, and the temporary unique identifier, and wherein the first permanent unique identifier is not provided to the computing device or the tracking system server;

generate a second permanent unique identifier based on the first random number, the second random number, and an interim unique identifier using a predetermined function configured to generate the second permanent unique identifier, wherein the second permanent unique identifier is generated independently of the first permanent unique identifier as generated by the third-party electronic device;

exchange a verification value with the third-party electronic device and via the computing device, wherein the verification value comprises an indication of whether or not the first permanent unique identifier matches to the second permanent unique identifier; and in response to determining that the first permanent unique identifier matches to the second permanent unique identifier:

store the first permanent unique identifier or the second permanent unique identifier in a database associated with the tracking service;

provide to the computing device an acknowledgement that the third-party electronic device has been commissioned for use with the tracking service, wherein, as a result of the third-party electronic device being commissioned for use with the tracking service, the tracking system server is configured to store location updates for the third-party electronic device in association with the first permanent unique identifier or the second permanent unique identifier, and wherein, after the third-party electronic device is commissioned for use with the tracking service, the third-party electronic device does not communicate directly with the tracking system server;

receive an updated location associated with the third-party electronic device from one of a plurality of other computing devices associated with the tracking system server after communicatively coupling with the third-party electronic device; and provide to the computing device the updated location associated with the third-party electronic device.

14. The non-transitory computer-readable medium of claim 13, wherein:

the computing device is one of the plurality of other computing devices, wherein each of the plurality of other computing devices is executing respective instances of the application associated with the tracking service; and a value based on the first permanent unique identifier or the second permanent unique identifier and the updated location is received from the instance of the application associated with the tracking service executing on the one of the plurality of other computing devices after communicatively coupling with the third-party electronic computing device.

15. The non-transitory computer-readable medium of claim 14, wherein the instructions further comprise instructions to:

determine that the location associated with the third-party electronic device exceeds a threshold distance from a location associated with the computing device; and notify the computing device that the location associated with the third-party electronic device exceeds the threshold distance.

16. The non-transitory computer-readable medium of claim 13, wherein the instructions further comprise instructions to:

receive a request for a location associated with the third-party electronic device from the computing device, the request comprising a value based on the first permanent unique identifier or the second permanent unique identifier;

retrieve the location associated with the third-party electronic device from the database by querying the database utilizing the first permanent unique identifier or the second permanent unique identifier; and provide the retrieved location associated with the third-party electronic device to the computing device.

17. The non-transitory computer-readable medium of claim 13, wherein the instructions further comprise instructions to:

determine an interim authentication key based on the interim unique identifier.

18. The non-transitory computer-readable medium of claim 17, wherein the tracking system server has stored a plurality of preliminary unique identifiers in association with a plurality of interim authentication keys in the database associated with the tracking service; and wherein the instructions to determine the interim authentication key further comprise instructions to query the database with the received interim unique identifier.

19. The non-transitory computer-readable medium of claim 13, wherein the instructions to exchange the verification value further comprise instructions to:

receive, from the computing device, a first session key generated by the third-party electronic device;

generate a second session key based on a predetermined combination of the first permanent unique identifier or the second permanent unique identifier and information not received from the computing device; and verify the information by comparing the first session key and the second session key.

20. The non-transitory computer-readable medium of claim 13, wherein the verification value is a session key for a communication session between the third-party electronic device and the tracking system server.

* * * * *